(No Model.)

J. R. PHELPS.
SPREADER FOR GAITING HORSES.

No. 444,570. Patented Jan. 13, 1891.

Witnesses,

Inventor
James R. Phelps
By Dewey & Co.
Attys

UNITED STATES PATENT OFFICE.

JAMES R. PHELPS, OF SACRAMENTO, CALIFORNIA.

SPREADER FOR GAITING HORSES.

SPECIFICATION forming part of Letters Patent No. 444,570, dated January 13, 1891.

Application filed October 2, 1890. Serial No. 366,892. (No model.)

*To all whom it may concern:*

Be it known that I, JAMES R. PHELPS, a citizen of the United States, residing at Sacramento, Sacramento county, State of California, have invented an Improvement in Spreaders for Gaiting Horses; and I hereby declare the following to be a full, clear, and exact description of the same.

My invention relates to a device, which is called a "spreader," for the purpose of giving horses a proper gait and causing them to spread the hind feet when traveling so as not to interfere or overreach.

It consists in certain details of construction, which will be more fully explained by reference to the accompanying drawings, in which—

Figure 1:
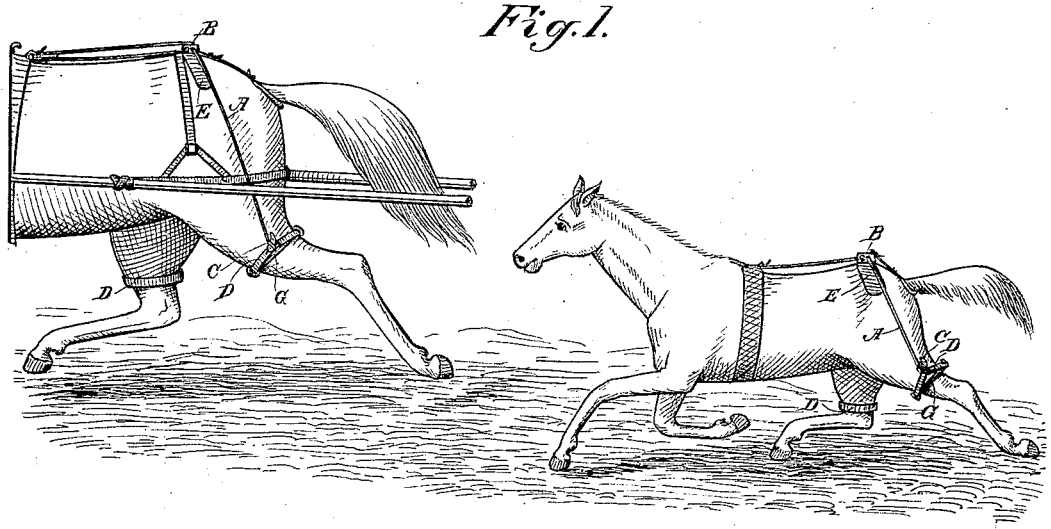
Figure 2:
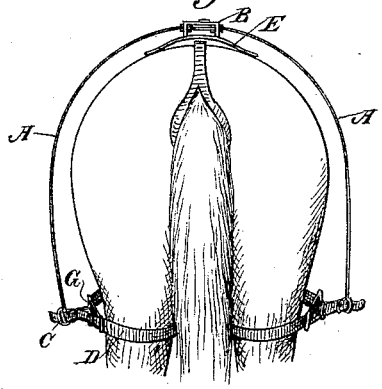
Figure 3:
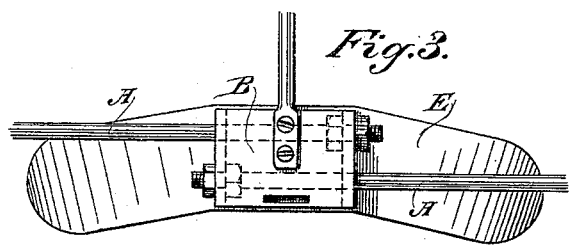
Figure 4:
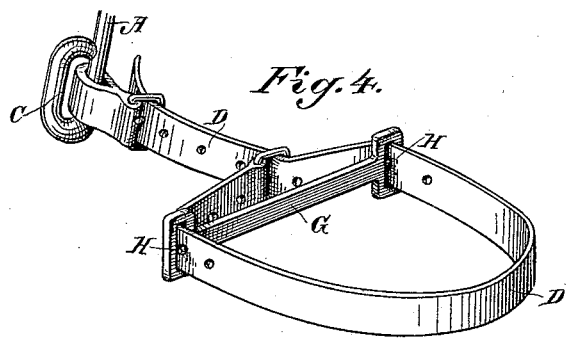

Figure 1 is a side view showing the application of my device to a horse. Fig. 2 is a rear view of the same. Fig. 3 is a top view. Fig. 4 is a view of the leg-strap and extending-bar.

In a former invention made by me for which a patent was allowed July 2, 1890, I have shown a spreader in which two elastic arms or branches are supported from the back of the animal, and are provided with extensions, which extensions are connected with the hind legs of the horse by straps.

My present invention is an improvement upon that device; and it consists of the continuous elastic arms A, which are pivoted or swiveled so as to turn in a suitable support B upon the back of the animal. These arms A are bent in a curve, and the lower ends have attachments C, by which the straps D may be connected with them. These straps or continuations thereof pass around the hind legs of the animal, and the constant elastic pressure of the arms pulling upon these straps tends to draw the hind legs apart, and thus cause the animal to travel with the hind legs wide apart, so that there is no danger of interference while traveling, and by reason of the legs being held apart they will pass outside of the front legs, and "forging" or "overreaching," as it is called, will be prevented.

In my former invention I showed the elastic arms extending down to a point opposite the hip joint, at which point extensions were hinged to the ends of these arms and the movement took place in these joints which were intended to correspond as closely as possible with the movements of the hip joints of the animal. Experience has shown me that the changes in position which take place when the horse is extended in traveling rapidly are such that the relative position of these joints and those of the animal will be changed, and the operation of the device will not be as smooth as could be desired. I have therefore made each of the elastic arms in a single continuous piece, which is preferably made of round spring-steel, and the upper ends pass through the housing or support B, within which they are allowed to turn freely, and as this journal is approximately a horizontal one it will be seen that when the horse is traveling and the lower ends of these arms are being moved to and fro by the action of the horse's legs these swiveled ends will simply turn in the bearing or housing B upon the back. This bearing may be made in various ways, either as upwardly-projecting lugs formed upon a casting which is fixed or supported upon the back of the horse, or, as in the present case, in the form of a housing or cap, the ends of which extend out in each direction so as to form a pad or support E, which rests upon the horse's back. These ends are covered and protected by leather, so as to present a soft surface to rest upon the back of the horse and the leather extends across the open space or arch formed by the part B, through which the ends of the arms A are swiveled, and this central portion being soft and flexible is easily bent into any form to suit the shape of the horse's back to which the apparatus is applied. This pad or saddle and the journal in which the arms A turn are supported by a connection extending along the horse's back and attached at the front end to the harness, saddle, or girth, and at the rear end it may be connected with the crupper-strap, so that the device will be held in proper position upon the back of the horse.

In order to prevent the straps D, which pass around the horse's legs, from turning and chafing with the movements of the leg, I employ a stiff or rigid bar G, which is fixed in the straps D outside of the horse's leg. This bar may be made of wood or metal, and it may have buckles attached to it for the attachment of the strap. In the present case I have shown it as made of metal and having loops at each end, through which the strap passes, and short tongues H, which will fit into holes made in the strap, so as to hold the piece G in the proper place and keep it from slipping or moving upon the strap. The ends of the strap are then brought together and connected with the lower ends of the spreader-arms A, as before described. If desired, an eye or loop could be formed in the center of the bar G, to which the strap might be connected; but this would make it necessary to make the bar somewhat stiffer and heavier to prevent its bending, as there would then be a pull or strain upon the center, whereas with the construction here shown the only strain is the pressure endwise upon the bar. For this reason I consider this construction preferable.

By means of the tongues H, I am enabled to lengthen or shorten the straps so as to fit them to any-sized leg, and the bar G, by keeping the loop of the strap open, will prevent its touching any point except the inside of the leg. It also prevents the strap from slipping and chafing the leg.

It will be manifest that this apparatus may be applied to young colts or horses running in the pasture and without any harness upon them, the connection by which the device is steadied and kept in place being simply made by a crupper and surcingle which passes around the body of the animal.

By the movement of the arms A about the support at the top the lower ends follow more truly the movements of the animal's legs in taking the steps either in trotting, pacing or running.

Having thus described my invention, what I claim as new, and desire to secure by Letters Patent, is—

1. A spreader for horses, consisting of the curved elastic arms, the lower ends of which have straps connected with them to encircle the hind legs of the horse, and a support upon the harness, in which the upper ends of the arms are swiveled or pivoted to turn, substantially as herein described.

2. A device or spreader for horses, consisting of the elastic curved arms having their upper ends movable independently in a support upon the harness, the lower ends connected with straps to encircle the hind legs of the horse, whereby an outward pull is exerted upon the legs and the elastic arms are allowed to oscillate and move in unison with the movements of the horse's legs, substantially as herein described.

3. The independent elastic arms having the lower ends provided with straps to encircle the horse's hind legs, a pad adapted to be placed upon the horse's back and having supports or journals in which the upper ends of the elastic arms turn horizontally so as to move independently of each other, and a means for connecting said support with the girth or surcingle and retaining it in place, substantially as herein described.

4. The curved elastic movable arms supported from a pad upon the horse's back, straps connecting with the lower ends of said arms and adapted to surround the horse's legs, and the extending bar G, by which the outer portion of the strap is kept from contact with the outer side of the leg, substantially as herein described.

5. The combination, with the straps D, suspended from arms connected with the harness, of rigid bars within said straps, having end loops or buckles provided with tongues adapted to enter holes in the straps, whereby the straps are adjusted, substantially as herein described.

In witness whereof I have hereunto set my hand.

JAMES R. PHELPS.

Witnesses:
  S. H. NOURSE,
  H. C. LEE.